219-121

12/29/87 OR 4,716,270

United States Patent [19]

Gnanamuthu et al.

[11] Patent Number: 4,716,270

[45] Date of Patent: Dec. 29, 1987

[54] NON-CONTACT SCRIBING PROCESS FOR ORGANIC MASKANTS ON METALS OR ALLOYS THEREOF

[75] Inventors: Daniel S. Gnanamuthu; R. J. Moores, both of Newbury Park; N. E. Paton, Thousand Oaks, all of Calif.; Richard F. Vyhna, Tulsa, Okla.

[73] Assignee: Rockwell International Corporation, El Segundo, Calif.

[21] Appl. No.: 795,003

[22] Filed: Nov. 4, 1985

[51] Int. Cl.[4] .............................................. B23K 26/00

[52] U.S. Cl. ..................... 219/121 LM; 219/121 EK; 219/121 LJ; 219/121 LA; 219/121 LN; 156/643; 156/272.2; 29/DIG. 2

[58] Field of Search .................. 219/121 LJ, 121 LK, 219/121 EJ, 121 EK, 121 LA, 121 LM, 121 LN; 156/345, 643, 904, 272.2; 29/572, 584, DIG. 2

[56] References Cited

U.S. PATENT DOCUMENTS

| | | | |
|---|---|---|---|
| 4,504,354 | 3/1985 | George et al. | 219/121 LJ |
| 4,568,409 | 2/1986 | Caplan | 219/121 LM |

OTHER PUBLICATIONS

IBM Technical Disclosure Bulletin, vol. 22, #12, May 1980—"Removal of $SiO_2$ from Surfaces by Absorption of Laser Light", Fowler et al.

*Primary Examiner*—M. H. Paschall
*Attorney, Agent, or Firm*—Charles T. Silberberg; Max Geldin

[57] ABSTRACT

A method is disclosed for scribing chemical milling maskant applied to a metal substrate by impinging a laser beam on the maskant and controlling the beam to penetrate through the maskant substantially without damaging the underlying metal. In carrying out the process, a metal part such as aluminum, titanium or their alloys is coated with an organic polymer maskant having absorption to a laser beam, a predetermined pattern is scribed in the maskant by impinging a laser beam, e.g. a Nd:YAG (neodymium doped yttrium aluminum garnet) laser, under controlled conditions to scribe a predetermined pattern in the maskant and substantially without damaging the underlying metal, removing the maskant portion within the circumscribed area of the pattern to expose the underlying metal and leaving the remaining maskant portion adhered to the substrate, immersing the metal substrate in a chemical milling solution, e.g. an alkali solution, under controlled conditions to remove a predetermined thickness of the exposed metal from the substrate, and thereafter removing the remaining maskant portion from the substrate.

19 Claims, No Drawings

NON-CONTACT SCRIBING PROCESS FOR ORGANIC MASKANTS ON METALS OR ALLOYS THEREOF

BACKGROUND OF THE INVENTION

This invention relates to the chemical etching or chemical milling of metal parts, and is particularly concerned with a chemical milling process employing a unique and improved means for scribing the maskant on the metal or metal alloy employed in the process.

In chemical etching or milling, material or metal is removed from the surface of the part by treatment thereof in an etching solution to obtain a part having a desired structural or ornamental configuration. It is known to etch acid soluble metals such as iron and zinc with an acid solution such as aqueous nitric acid. It is also known to etch alkali soluble metals such as aluminum and its alloys with a solution having a solvent action on the aluminum or alloy surface, such as a hot aqueous alkali solution, e.g. one containing sodium hydroxide.

In many instances, in order to produce a desired etch configuration on an article in a practical manner, it is necessary to mask certain portions of the surface of the article so as to prevent contact of such surface portions by the etching solution.

Thus, presently practiced selective chemical milling of metal parts, such as aerospace parts, involves coating the part with a uniform layer of maskant material, manually scribing a pattern of "cut-outs" (which are to be subsequently subjected to chemical milling) using an overlay template to control the scribing pattern and a sharp instrument, such as an x-acto knife, to scribe or penetrate, the maskant, peeling away the maskant from within the circumscribed boundaries to expose the underlying metal, immersing the part for a controlled period of time in an etching bath, either acid or basic, to achieve localized thinning of the exposed metal, and removing the remaining maskant from the part surface.

The manual scribing operation represents the largest cost element in this process, including the labor involved in tracing the pattern as well as the expense involved in the provision of templates. Further, the presently practiced scribing procedure also presents a problem in that occasionally the underlying metal will be scored by the knife and result in increased local chemical milling attack, producing a furrow along the score mark after chemical milling, which must be blended out. Another important criterion is that it is important to be able to peel off the maskant following scribing, without disturbing the adhesion of the surrounding remaining maskant on the metal, e.g. aluminum surface. If there is any lift-off or peel-back of such remaining maskant, it must be repaired, for example tacked back down by wetting with solvent, so that subsequent chemical milling attack will not extend into the lift-off area.

It is known to utilize a laser for the purpose of removing metal or plastic from stock material.

Thus, U.S. Pat. No. 4,411,730 discloses a process for machining nickel-base super alloys wherein a thermal-effect process, such as a laser, is first used to remove metal, leaving a recast layer, followed by chemical milling wherein the etchant attacks and removes only the recast layer.

U.S. Patent No. 4,368,080 discloses a method of removing rust from the surface of a metal object by focusing a laser beam upon the rust to heat the rust to evaporation temperature to thereby evaporate the rust.

U.S. Pat. No. 4,405,852 discloses a method of decorating spectacle frame parts by removing a jacket material, which can be a plastic material, from the core according to a decorative pattern, thus exposing a bright surface of the core. The jacket material is removed by a laser beam.

An object of the present invention is the provision of an improved means for scribing a pattern in chemical milling maskant.

Another object is to provide a non-contact means of scribing a pattern in a maskant applied in the chemical milling of metals, such as aluminum and titanium, which avoids the disadvantages of manual scribing, and which does not deleteriously affect the base metal underlying the maskant.

SUMMARY OF THE INVENTION

The above objects of the invention are achieved and the scribing of chemical milling maskant is carried out by impinging a laser beam on the maskant and controlling the beam to penetrate through the maskant substantially without damaging the underlying metal. Thus, a laser beam incident on a maskant-coated metal surface is moved in a programmed pattern to scribe the thin maskant layer down to the underlying metal, thus allowing the maskant to be subsequently peeled away from selected areas on the part surface to expose them to a chemical milling solution for local thickness reduction. This contactless laser scribing replaces the presently employed manual scribing using a knife against a template.

In addition to the elimination of the high labor costs required in the present manual scribing operation, the laser scribing concept of the present invention eliminates the need for detailed, contour-matched templates presently employed to control the scribe pattern.

In addition, the laser scribing procedure of the present invention can be controlled to avoid scoring the metal underlying the maskant so that no residual marks or furrows are present in the part after the chemical milling operation. In addition, the laser scribing method of the invention does not adversely affect the adhesion of the remaining surrounding maskant, following laser scribing, and there is no lift-off or peel-back of such remaining maskant, so that subsequent chemical milling of the exposed metal will not extend into the adjacent areas covered by the remaining maskant.

According to the invention, the metal part to be subjected to chemical milling, for example aluminum or titanium, is first coated with a uniform layer of a maskant material, comprised essentially of an organic polymer. A laser beam is impinged on the maskant and is controlled to scribe a predetermined pattern in the maskant, the intensity and time duration of the impinging laser beam being such as to prevent any damage or scoring of the underlying metal surface. The laser beam is preferably guided by a mechanism which is programmed to scribe such predetermined pattern in the maskant.

After completion of the scribing operation and removal of the laser beam, the maskant within the boundaries scribed by the laser beam is peeled from the surface to expose the underlying metal, leaving the remaining portions of the maskant adhered to the surface.

The part is then immersed in a suitable etching or chemical milling bath, such as an alkaline bath in the case of an aluminum part, for a controlled period of time and at a suitable temperature, to achieve a selected amount of metal removal from the exposed metal surface. Following chemical etching, the part is removed from the etching solution and the remaining maskant is peeled from the part to provide the desired chemically milled part having areas of reduced thickness.

The invention accordingly provides an efficient non-contact method of scribing a predetermined pattern in a chemical milling maskant applied to metal, the method consisting of the use of laser scribing, suitable particularly for automation, e.g., via computer controlled devices known as "NC" (numerical control) machines or CNC (computer numerical control) machines.

DETAILED DESCRIPTION OF THE INVENTION AND PREFERRED EMBODIMENTS

In carrying out the invention process, any metal can be employed capable of undergoing a controlled etch in either acid or basic solutions. Thus, metals such as iron, capable of being etched or chemically milled in acid solutions such as aqueous nitric acid, can be employed, and metals such as aluminum, titanium, and their alloys, capable of being chemically milled in alkali solutions containing sodium hydroxide, and generally employed in the aerospace industry, are particularly applicable for use in the invention process. The invention will be described hereinafter in terms principally of the use of aluminum and its alloys, although it will be understood that this is not limitative of the invention.

A maskant is first applied to the metal or aluminum part. The maskant employed should be one which is readily applied to the substrate by conventional methods such as for example, spraying or dipping, is inert to etching solutions, e.g. of the alkaline or acid type, and has adherence to the substrate in a controllable degree, so that the mask will adhere to the substrate under the severe conditions of the etching bath, usually at elevated temperatures, but which is readily removable by hand stripping both before and after etching.

It is also essential that the organic maskant possess absorption to a laser beam, and particularly high absorption to the Nd:YAG (wavelength = 1.06 $\mu$m), the Nd:Glass (wavelength = 1.06 $\mu$m) and $CO_2$ (wavelength = 10.6 $\mu$m) laser beams. Absorption of the laser beam by the maskant is necessary in order to obtain scribing.

To meet these requirements, maskant compositions can be employed which contain as an essential ingredient thereof an organic polymer such as a chloroprene polymer resin, a styrene butadiene block copolymer, marketed as ADCOAT 820 (green) and a styrene ethylene butylene copolymer, marketed as ADCOAT 850 (yellow), the latter two maskant compositions being preferred. Such maskant compositions can also include fillers such as carbon black, solvents, retardants and accelerators, present in varying proportions, as is well known in the art.

The maskant composition is applied to the surface of the metal, e.g. aluminum, part by spraying, rolling, brushing, dipping or flow coating. The maskant is then cured either at ambient temperature or at suitably elevated temperature to reduce curing time. Thus, for example, in the case of the above ADCOAT 820 and 850 maskant compositions, the maskant can be cured at room temperature over a period of about 4 hours, or can be cured in an oven at 100° F. for 60 minutes, followed by treatment at 140° to 150° F. for 60 minutes.

A predetermined pattern is then laser scribed into the cured maskant according to the invention. The laser apparatus emits a laser beam of coherent radiation, and means for focussing the beam upon the surface of the object to scribe the maskant. Various types of lasers can be employed for purposes of the invention.

One preferred form of laser for use in the invention process is the above noted Nd:YAG (neodymium doped) (yttrium aluminum garnet) laser operating in the pulsed or continuous wave (CW) mode. Some of the primary process variables for laser scribing employing such laser are the scribing speed, laser beam spot overlap range, pulse rate or the frequency, laser power, position of the beam's focal point with respect to work surface, and the laser beam's transverse electromagnetic mode (TEM), which represents the intensity distribution along the diameter of a laser beam's cross section.

With respect to the scribing speed, the laser beam spot can be moved across the work surface at selected speeds. Typical scribing speeds range between 0.1" to 10" per second. The laser beam spots generally overlap by selected number of spots per inch (pulse/inch). The extent of beam spot overlap depends on the scribing speed.

As the laser beam is scanned across the work piece, it vaporizes a series of overlapping holes in the maskant. The pulse rate or frequency of pulsing of the YAG laser is the product of the markin or scribing speed (number of inches per second) and the laser beam spot overlap (pulses per inch). Typical pulse rate can range between 1000 and 40,000 Hertz. Peak laser power can range from about 500 to about 20,000 watts, and is controlled by current setting for the flash lamp. Also, for a selected current setting, by increasing pulse rate the average beam power is increased while the peak power is decreased. The beam can be focused to the smallest spot diameter at the focal point of the focusing mirror or lens of the system. Spot diameter of the beam on the maskant can range from about 0.001 to about 0.01" in diameter.

Another form of laser which is suitable is the above noted Nd:Glass (neodymium doped glass) laser operating in the pulsed mode, and having similar operating parameters as noted above for the Nd:YAG laser.

Another form of laser which is suitable is a gas laser, particularly the above noted $CO_2$ gas laser operating in the pulsed mode or the continuous wave mode. The $CO_2$ laser beam is directed via a system of mirrors and through a lens. The beam is focused onto the maskant down to a spot diameter of approximately 0.001" to about 0.010" in size. The output power can be adjusted from approximately 50 watts up to about 1,500 watts. The beam can be focused onto the part containing the maskant, with the part a distance of approximately 2 to 10" from the lens. In one embodiment the $CO_2$ laser emits a continuous wave coherent beam $1\frac{3}{4}$" in diameter which is focused through the lens system to the above noted spot size.

In preferred practice, the laser is controlled so that its movement is operated automatically to scribe the predetermined pattern into the maskant. Thus, the laser can be connected to an NC (numerical control) or CNC (computer numerical control) machine which operates the laser by means of programmed instructions, e.g. computer programmed, to provide a computer-controlled beam scanning system. This device translates information on a floppy disc or tape into electronic signals to the NC or CNC machine which controls the motion of the laser beam. This generates a predetermined motion to the scanning laser beam to scribe a predetermined pattern into the maskant o stationary workpiece. Thus, the motion of the laser beam is controlled by the numerical control device. Such numerical control devices are well known and employed, for example, in metal machining and paint spraying operations, and hence form no part of the present invention.

If desired, the movement of the laser beam can be manually carried out to scribe a predetermined pattern into the maskant, but the automatic NC or CNC control system is preferred to avoid manual operation, and to obtain uniform and consistent scribe patterns where the same scribe pattern is to be applied to a plurality of maskant covered substrates.

The laser scribing operation is often carried out employing a plurality of passes of the laser beam around the preselected pattern being scribed into the maskant, so as to ensure scribing of the maskant entirely through the maskant to the surface of the underlying metal. Thus, the power of the laser and the number of passes is controlled to penetrate through the maskant to provide the desired "cut-out" but without damaging or scoring the underlying metal, e.g. aluminum.

Although movement of a scanning laser beam with respect to the maskant on a stationary workpiece is preferred, the workpiece with the maskant to be scribed thereon can be moved under controlled conditions under a stationary laser beam.

The maskant portion within the circumscribed boundaries of the "cut-out" is then peeled from the area of the part to be chemically milled. It is important to be able to peel off such maskant portion without disturbing the adhesion of the surrounding and remaining maskant to the metal, e.g. aluminum. Thus, the laser power and the scribing speed thereof are also controlled to ensure such adhesion of the remaining maskant, thus avoiding any lift-off or peel-back thereof which would be subject to attack by the etchant solution.

The part containing remaining maskant in those areas to be protected from the chemical etchant, is then immersed in a chemical milling solution. Such solution in the case of aluminum can be basically a sodium hydroxide solution. In preferred practice, the alkali etchant solution also contains sodium sulfide, e.g. in an amount of about 0.1 to about 10% by weight of the alkali. The alkali etchant can also contain other additives such as triethanolamine. An exemplary type of alkali etchant which can be employed is the chemical milling composition marketed as Turcoform Etchant 9H, by Purex Corp., and believed to comprise an aqueous solution of sodium hydroxide and sodium sulfide, in the proportions noted above.

Etching in the chemical milling solution is generally carried out at elevated temperature, e.g. of the order of about 190° F. to facilitate etching and reduce etching time. The depth of milling and the condition of the maskant is monitored, based on the etch rate, to ensure completion of etching of the metal workpiece to the desired depth of etch.

The part is then removed from the etchant solution and rinsed to remove chemical milling solution from the part.

The part can then be immersed in a smut removing composition such as one comprising sodium acid sulfate, ammonium bifluoride and a small amount of a wetting agent, to desmut the chemically milled areas. The part is then spray rinsed and allowed to dry.

The remaining maskant is then peeled from the surface of the chemically milled part to provide the metal part having a chemically etched area of predetermined size and shape, and of reduced thickness compared to the unetched areas.

The following are examples of practice of the invention, such examples being understood as only illustrative of the invention and not in limitation thereof.

EXAMPLE I

Six samples of 7075 aluminum were cleaned by solvent vapor degreasing and by treatment in an alkaline cleaner.

ADCOAT 850 (yellow) maskant composition was applied by spraying to three of the aluminum samples, and ADCOAT 820 (green) maskant composition was applied to the remaining three aluminum samples by spraying. The maskant on the samples had a thickness of about 10 mils.

The maskant on each of the six samples of aluminum was cured.

A Nd:YAG laser of the type described above, having an average output power of 50 watts and having a pulse rate of 2,000 Hertz and a scribing speed of 2" per second, was used to scribe a preselected etch pattern in the maskant on each of the six samples, the work surface being positioned 0.7" below the beam focus. For this purpose, the laser was connected to a CNC machine which moved the laser beam at the above noted controlled marking speed automatically according to a programmed computer, to scribe the same preselected pattern in each of the maskant coatings.

Each of the three samples of the two sets of samples containing ADCOAT 850 and ADCOAT 820 maskant was subjected to several passes of the laser beam according to the following schedule:

TABLE

| | | Total Running Time |
|---|---|---|
| ADCOAT 850 (yellow) | | |
| Sample I | 6 passes | 1 sec/pass = 6 sec. |
| Sample II | 8 passes | 1 sec/pass = 8 sec. |
| Sample III | 12 passes | 1 sec/pass = 12 sec. |
| ADCOAT 820 (green) | | |
| Sample 1 | 8 passes | 1 sec/pass = 8 sec. |
| Sample 2 | 10 passes | 1 sec/pass = 10 sec. |
| Sample 3 | 12 passes | 1 sec/pass = 12 sec. |

The maskant portion within the circumscribed boundaries of each scribed sample was peeled from the aluminum part and all six samples were immersed in the alkaline etching solution Turcoform Etchant 9H, noted above, an aqueous solution having the following approximate composition:

| | Oz/gal |
|---|---|
| NaOH | 15-20 |
| $Na_2S$ | 2-3 |
| Al (dissolved) | 3-10 |

The parts were maintained in the etchant solution for a period sufficient to remove a predetermined thickness of about 0.060" of metal, from each sample, the immersion time and etch rate being monitored to ensure the proper amount of metal removal for each sample.

The etched samples were removed from the etchant solution and spray rinsed and dried.

The remaining portion of the maskant on each of the six samples was peeled from each of the samples, leaving each of the resulting samples chemically etched or milled to the same depth.

It was noted that following laser scribing of each of the six samples, there was no scoring of metal by the laser along the borders of the laser scribed pattern.

Also, it was observed that following removal of the maskant portion within the laser scribed area on each sample, and both before and after etching, there was no indication of any deterioration of maskant adhesion in the remaining portion of maskant adjacent to the laser scribe.

It was further observed that for all six samples, sharp boundaries were present around the laser scribed etched areas of the samples. However, in the case of those samples which received more than a necessary number of passes (e.g. 10 or 12 passes) of the laser beam, there was a pattern of closely spaced fine depressions observed following etching, which are believed related to the pulsed mode of operation of the laser, but which essentially did not affect the quality of the etch.

EXAMPLE II

ADCOAT 850 (yellow) and ADCOAT 820 (green) maskant coatings were applied to samples of 7075 aluminum in the same manner as described in Example I above.

A template was laid out on the maskant coating and an etch pattern of the same configuration as in Example I was cut in each of the maskant coatings using an X-Acto knife in the conventional manner, to completely cut through the maskant while avoiding scoring of the underlying aluminum.

After peeling the circumscribed portion of the mask from the area to be milled on each of the samples, the samples were subjected to chemical milling in an alkaline solution of the type described in Example I above, for a period to obtain the same depth of etch as in the samples of Example I.

The samples were then removed from the etchant solution, and the remaining portions of maskant removed from each of the samples.

A comparison of the chemically milled samples of Example I employing laser scribing of the maskant, with the chemically milled samples of Example II employing conventional template and manual knife scribing of the maskant, showed no significant difference in the quality of the etched area in the parts processed in Example I according to the invention, as compared to the etched parts processed according to the procedure of the prior art employing a template and manual knife scribing.

From the foregoing, it is seen that the invention provides an efficient non-contact scribing procedure for scribing a pattern in chemical milling maskant applied to metal substrates such as aluminum and titanium, employing a laser beam utilized and controlled to penetrate through the maskant without damaging the underlying metal, and which avoids the disadvantages of the prior art contact scribing procedure utilizing template and knife scribing of chem-mill maskant.

Since further changes and modifications of the invention will occur to and can be made readily by those skilled in the art without departing from the invention concept, the invention is not to be taken as limited except by the scope of the appended claims.

What is claimed is:

1. A method for scribing chemical milling maskant applied to a metal substrate which comprises impinging a laser beam on an organic maskant applied to said metal substrate, said organic maskant having a predetermined thickness and possessing adsorption to a laser beam, controlling the intensity and time duration of the beam to penetrate through the entire thickness of the maskant but substantially without damaging the underlying metal substrate to scribe a pattern in said maskant, and physically removing the maskant portion within the circumscribed boundary of said pattern, the laser power and scribing speed of the beam being also controlled to ensure adhesion of the remaining maskant to the substrate.

2. The method of claim 1, including guiding the movement of the laser beam by means of a mechanism programmed to scribe a predetermined pattern in the maskant.

3. The method of claim 2, wherein said mechanism comprises a numerical control machine or a computer numerical control machine.

4. The method of claim 1, wherein said laser beam is generated by a Nd:YAG (neodymium doped yttrium aluminum garnet) laser or a Nd:Glass (neodymium doped glass) laser.

5. The method of claim 4, wherein said laser beam is generated by said Nd:YAG laser, and wherein said laser has a peak power of about 500 to about 20,000 watts, and is operated at a scribing speed of 0.1" to 10" per second, at a pulse rate of 1000 to 40,000 Hertz, and the spot size of the laser beam on the maskant ranges from about 0.001" to about 0.01" in diameter.

6. The method of claim 4, wherein said laser beam is generated by said Nd:Glass laser.

7. The method of claim 1, wherein said laser beam is generated by a $CO_2$ gas laser.

8. The method of claim 7, wherein said $CO_2$ gas laser has an output power ranging from about 50 to about 1500 watts and the spot size of the laser beam on the maskant ranges from about 0.001" to about 0.010" in diameter.

9. The method of claim 1, said metal substrate being aluminum, titanium, or their alloys, and said maskant is an organic polymeric maskant having absorption to Nd:YAG (wavelength = 1.06 μm), Nd:Glass (wavelength = 1.06 μm) and $CO_2$ gas (wavelength = 10.6 μm) laser beams.

10. The method of claim 1, said metal part being aluminum, titanium, or their alloys.

11. The method of claim 1, said maskant having a thickness of the order of about 10 mils.

12. A method for chemical milling of metals which comprises applying an organic polymer maskant on a metal substrate selected from the group consisting of aluminum, titanium and their alloys, said maskant being of substantial predetermined thickness and having absorption to a laser beam, scribing a predetermined pattern in said maskant by impinging a laser beam on said maskant and moving said laser beam under controlled conditions, the intensity and time duration of the beam being controlled to generate a plurality of spots in said maskant corresponding to said predetermined pattern, through the entire thickness of said maskant, substantially without damaging the underlying metal, removing the maskant portion within the circumscribed area of said pattern by peeling to expose the underlying metal and leaving the remaining portion of said maskant adhered to said metal substrate, the laser power and scribing speed of the beam being also controlled to ensure adhesion of the remaining maskant to the substrate, treating the substrate in a chemical milling solution under controlled conditions to remove a predetermined thickness of the exposed metal from the substrate, and removing the remaining maskant portion from the substrate.

13. The method of claim 12 wherein said laser beam is generated by a Nd:YAG (neodymium doped yttrium aluminum garnet) laser or a Nd:Glass (neodymium doped glass) laser.

14. The method of claim 13, employing said Nd:YAG laser, and wherein said laser has a peak power of about 500 to about 20,000 watts, and is operated at a scribing speed of 0.1" to 10" per second, at a pulse rate of 1000 to 40,000 Hertz, and the spot size of the laser beam on the maskant ranges from about 0.001" to about 0.01" in diameter.

15. The method of claim 12, wherein said laser beam is generated by a $CO_2$ gas laser.

16. The method of claim 15, wherein said $CO_2$ gas laser has an output power ranging from about 50 to about 1,500 watts and the spot size of the laser beam on the maskant ranges from about 0.001" to about 0.010" in diameter.

17. The method of claim 12, said organic polymer maskant comprising a styrene butadiene block copolymer or a styrene ethylene butylene copolymer.

18. The method of claim 12, said metal substrate being aluminum, and employing an aqueous chemical milling solution comprising sodium hydroxide and sodium sulfide.

19. The method of claim 12, said maskant having a thickness of the order of about 10 mils.

* * * * *